US012446648B2

(12) United States Patent
Merlo (10) Patent No.: US 12,446,648 B2
(45) Date of Patent: Oct. 21, 2025

(54) LOFTED LATTICE STRUCTURES AND METHODS OF MAKING THE SAME

(71) Applicant: Carbon, Inc., Redwood City, CA (US)

(72) Inventor: Austin M. Merlo, Valencia, CA (US)

(73) Assignee: CARBON, INC., Redwood City, CA (US)

(*) Notice: Subject to any disclaimer, the term of this patent is extended or adjusted under 35 U.S.C. 154(b) by 664 days.

(21) Appl. No.: 17/830,719

(22) Filed: Jun. 2, 2022

(65) Prior Publication Data

US 2022/0386733 A1 Dec. 8, 2022

Related U.S. Application Data

(60) Provisional application No. 63/196,446, filed on Jun. 3, 2021.

(51) Int. Cl.
*F16F 7/12* (2006.01)
*A41D 13/015* (2006.01)
(Continued)

(52) U.S. Cl.
CPC .......... *A42B 3/125* (2013.01); *A41D 13/015* (2013.01); *B33Y 80/00* (2014.12); *F16F 7/121* (2013.01); *B33Y 10/00* (2014.12)

(58) Field of Classification Search
CPC ...... A41D 13/015; A42B 3/125; B33Y 80/00; B33Y 10/00; F16F 7/121; F16F 7/123
See application file for complete search history.

(56) References Cited

U.S. PATENT DOCUMENTS 5,236,637 A 8/1993 Hull
5,391,072 A 2/1995 Lawton et al.
(Continued)

FOREIGN PATENT DOCUMENTS

WO 2015164234 A1 10/2015
WO 2016133759 A1 8/2016
WO 2016145182 A1 9/2016

OTHER PUBLICATIONS

Bikas, H., et al., "Additive manufacturing methods and modelling approaches: a critical review", Int. J. Adv. Manuf. Technol. 83, 389-405 (2016).
(Continued)

*Primary Examiner* — Thomas W Irvin
(74) *Attorney, Agent, or Firm* — MYERS BIGEL, P.A.

(57) ABSTRACT

An additively manufactured lattice includes a plurality of symmetrically oriented repeating unit cells. Each of the unit cells is comprised of a vertically oriented tubular structure having a top edge and bottom edge, said tubular structure defined by a circumferential side wall extending from said top edge to said bottom edge. The side wall has a lower portion, an intermediate portion, and an upper portion, with the lower portion terminating at the bottom edge, the upper portion terminating at the top edge, and the intermediate portion positioned between the lower portion and the upper portion. A plurality of spaced legs is included with each unit cell, with each leg formed as an outfolding of the side wall, each outfolding beginning at the side wall intermediate portion and extending progressively further outward through the side wall lower portion to the bottom edge.

19 Claims, 5 Drawing Sheets

(51) Int. Cl.
 *A42B 3/12* (2006.01)
 *B33Y 80/00* (2015.01)
 *B33Y 10/00* (2015.01)

(56) References Cited

U.S. PATENT DOCUMENTS

| | | | |
|---|---|---|---|
| 5,529,473 | A | 6/1996 | Lawton et al. |
| 7,438,846 | B2 | 10/2008 | John |
| 7,892,474 | B2 | 2/2011 | Shkolnik et al. |
| 8,110,135 | B2 | 2/2012 | El-Siblani |
| 8,336,933 | B2 * | 12/2012 | Nagwanshi ............ B62D 21/15 293/133 |
| 8,919,750 | B2 | 12/2014 | Pearce et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 10,143,266 | B2 * | 12/2018 | Spanks ............... A43B 13/181 |
| 10,220,881 | B2 * | 3/2019 | Tyan ..................... B32B 15/08 |
| 10,986,936 | B2 | 4/2021 | Dahl et al. |
| 11,028,895 | B2 * | 6/2021 | Yang ........................ F16F 3/02 |
| 11,071,348 | B2 * | 7/2021 | Caldwell ............... A43B 1/0009 |
| 11,167,395 | B2 | 11/2021 | Merlo et al. |
| 11,832,683 | B2 * | 12/2023 | Sakamoto ............. A43B 21/26 |
| 11,849,799 | B2 * | 12/2023 | Iwasa .................... B33Y 80/00 |
| 11,867,248 | B2 * | 1/2024 | Kabaria ................ B29C 64/386 |
| 12,077,215 | B2 * | 9/2024 | Godthi ................... B62D 25/04 |
| 12,173,771 | B2 * | 12/2024 | Kabaria ................ B29C 64/106 |
| 2008/0098601 | A1 * | 5/2008 | Heinz ................... B21D 53/88 296/187.03 |
| 2013/0193699 | A1 * | 8/2013 | Zannier ................ F16F 7/121 293/133 |
| 2013/0292862 | A1 | 11/2013 | Joyce |
| 2013/0295212 | A1 | 11/2013 | Chen et al. |
| 2013/0300138 | A1 * | 11/2013 | Banasiak ................ B60R 19/34 293/133 |
| 2015/0197206 | A1 * | 7/2015 | Tamura ................ B60R 19/34 293/133 |
| 2015/0331402 | A1 | 11/2015 | Lin et al. |
| 2015/0360419 | A1 | 12/2015 | Willis et al. |
| 2016/0242502 | A1 * | 8/2016 | Spanks ............... A43B 13/181 |
| 2016/0288376 | A1 | 10/2016 | Sun et al. |
| 2017/0129167 | A1 | 5/2017 | Castanon |
| 2017/0129169 | A1 | 5/2017 | Batchelder et al. |
| 2017/0327066 | A1 * | 11/2017 | Lakic ..................... B60R 19/34 |
| 2018/0057060 | A1 * | 3/2018 | Tyan ..................... B32B 15/10 |
| 2019/0093728 | A1 * | 3/2019 | Yang ....................... F16F 1/373 |
| 2020/0093221 | A1 * | 3/2020 | Caldwell ............... A43B 3/0036 |
| 2021/0195995 | A1 * | 7/2021 | Sakamoto ............... A43B 7/32 |
| 2022/0275845 | A1 * | 9/2022 | Kabaria ................ F16F 7/121 |
| 2022/0408880 | A1 * | 12/2022 | Iwasa ................... A43B 13/125 |
| 2023/0000206 | A1 * | 1/2023 | Hatano ................. F16F 1/3737 |
| 2024/0000182 | A1 * | 1/2024 | Weber .................... A42B 3/124 |
| 2024/0227712 | A1 * | 7/2024 | Sugiyama ............. B62D 21/152 |
| 2024/0285016 | A1 * | 8/2024 | Fasel ..................... A42B 3/063 |
| 2025/0033278 | A1 * | 1/2025 | Warren ................ B22F 3/1115 |

OTHER PUBLICATIONS

Janusziewcz , et al., "Layerless fabrication with continuous liquid interface production", Proc. Natl. Acad. Sci. USA 113, 11703-11708 (Oct. 18, 2016).

Tumbleston, John R., et al., "Continuous liquid interface production of 3D Objects", Science, 347(6228), 2015, 1349-1352.

Yokoya, K. , et al., "Deformation behavior of axially compressed aluminum polygonal tubes", Procedia Engineering 207, 251-256 (2017).

* cited by examiner

FIG. 9 (section C-C)

FIG. 8 (section A-A)

FIG. 7 (section A-A)

FIG. 13 (section A-A)

FIG. 14 (section B-B)

FIG. 15 (section C-C)

LOFTED LATTICE STRUCTURES AND METHODS OF MAKING THE SAME

FIELD

Lattice structures comprised of buckling walls, particularly with buckling walls incorporating a tunable or graded buckling response, are described, along with articles incorporating the same and methods of making the same.

BACKGROUND

Figure 1:
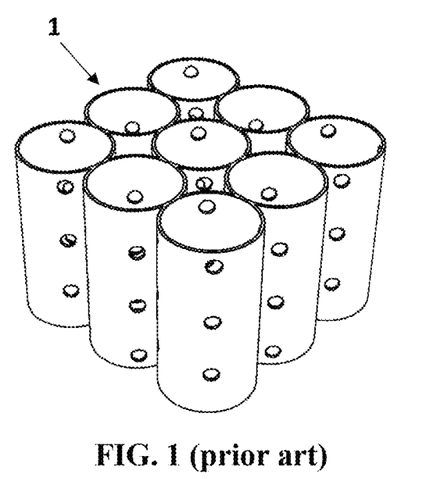
FIG. 1 is a perspective view of one example of a prior art lofted lattice structure.
Figure 2:
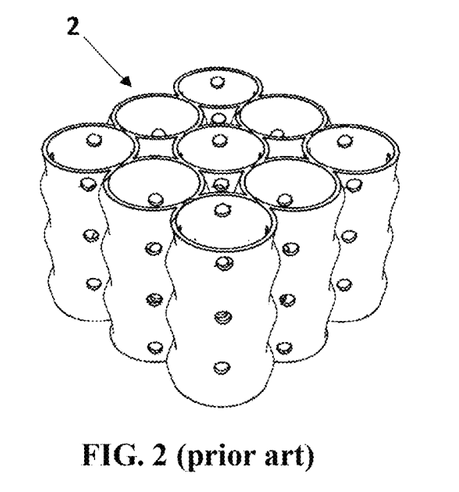
FIG. 2 is a perspective view of a second example of a prior art lofted lattice structure.
Figure 3:
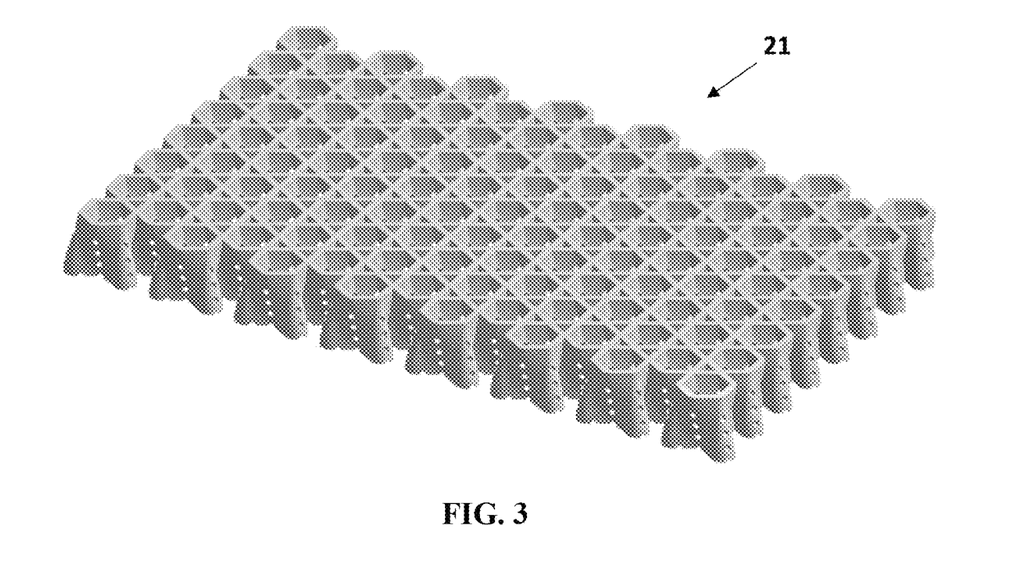
FIG. 3 is a perspective view of a first example of a lofted lattice structure of the present invention.
Figure 4:
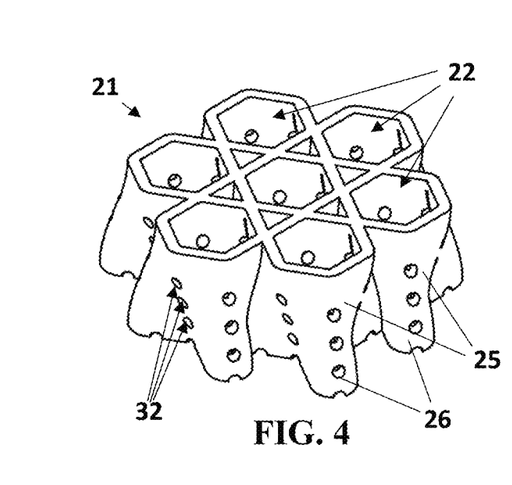
FIG. 4 is a detailed perspective view of the lofted lattice of FIG. 3 including seven interconnected unit cells.
Figure 5:
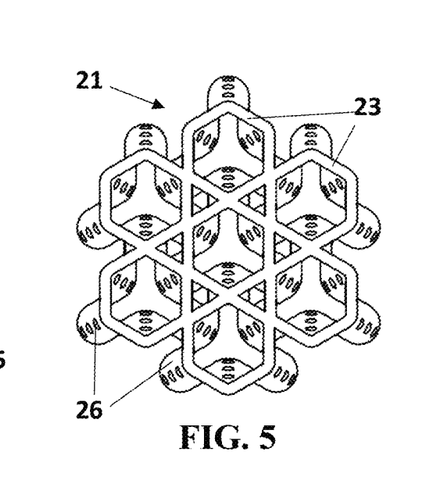
FIG. 5 is a top plan view of the lofted lattice of FIG. 4.
Figure 6:
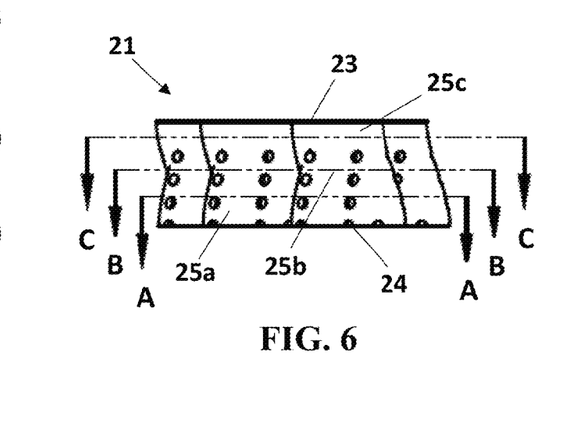
FIG. 6 is a side view of the lofted lattice of FIGS. 4-5.
Figure 7:
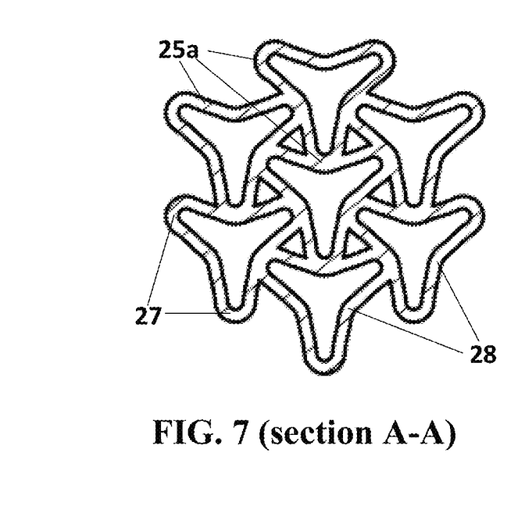
FIG. 7 is a top sectional view of the lofted lattice of FIGS. 4-6, taken along section A-A of FIG. 6.
Figure 8:
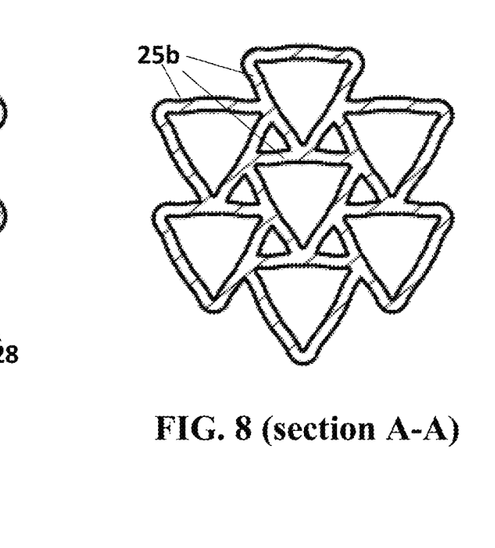
FIG. 8 is a further top sectional view of the lofted lattice of FIGS. 4-6, taken along section B-B of FIG. 6.
Figure 9:
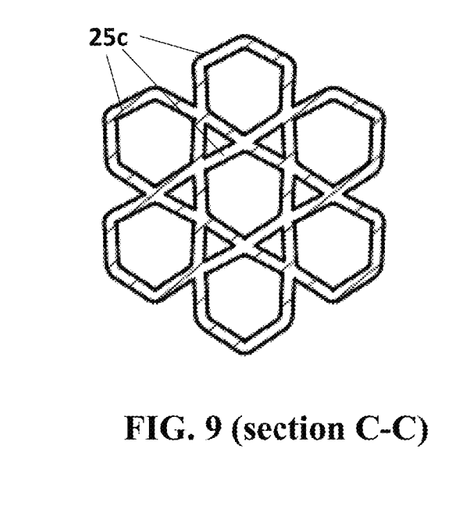
FIG. 9 is a still further top sectional view of the lofted lattice of FIGS. 4-6, taken along section C-C of FIG. 6.
Figure 10:
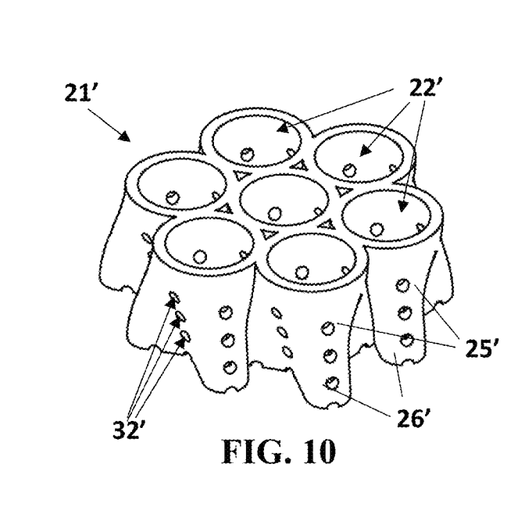
FIG. 10 is a perspective view of a second example of a lofted lattice structure of the present invention, including seven interconnected unit cells.
Figure 11:
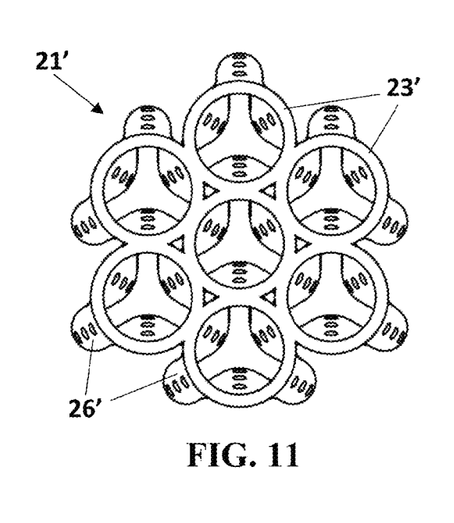
FIG. 11 is a top plan view of the lofted lattice of FIG. 10.
Figure 12:
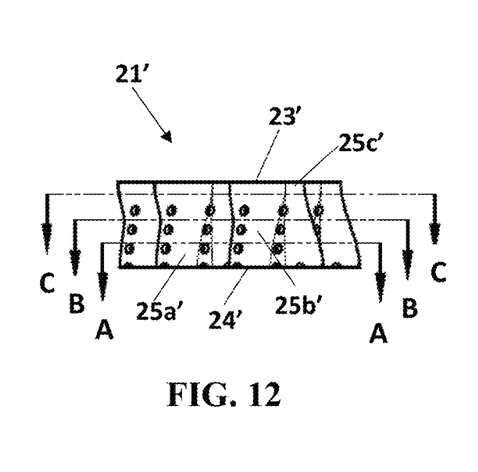
FIG. 12 is a side view of the lofted lattice of FIGS. 10-11.
Figure 13:
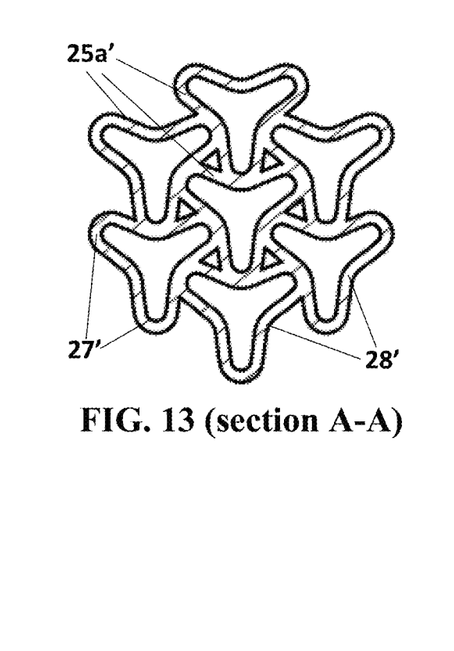
FIG. 13 is a top sectional view of the lofted lattice of FIGS. 10-12, taken along section A-A of FIG. 12.
Figure 14:
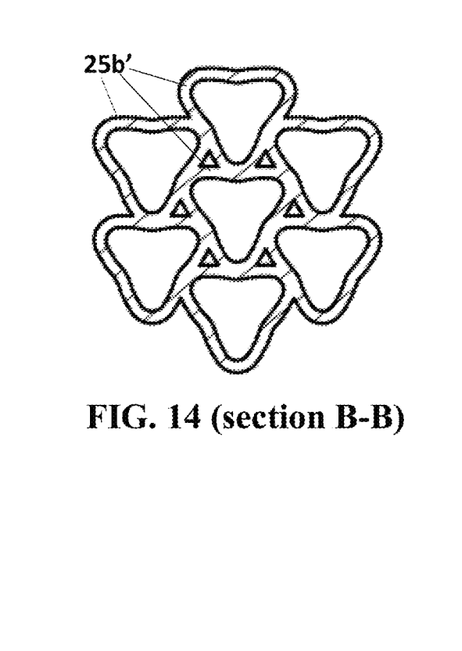
FIG. 14 is a further top sectional view of the lofted lattice of FIGS. 10-12, taken along section B-B of FIG. 12.
Figure 15:
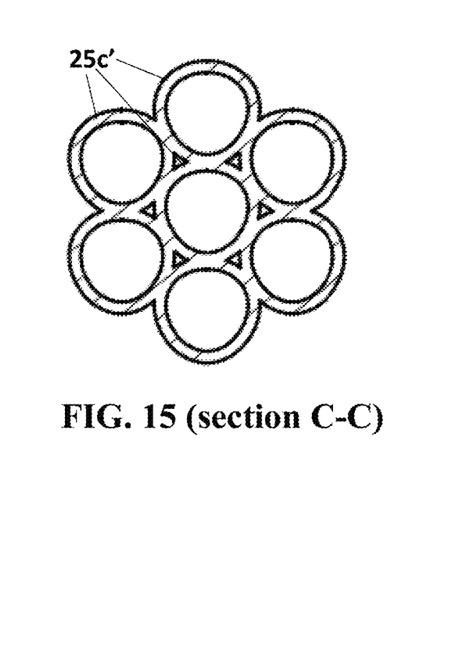
FIG. 15 is a still further top sectional view of the lofted lattice of FIGS. 10-12, taken along section C-C of FIG. 12.

Compressible tubes are known as efficient energy absorbers for a variety of structures (see, e.g., K. Yokoya et al., *Deformation behavior of axially compressed aluminum polygonal tubes*, Procedia Engineering 207, 251-256 (2017)). Such tubes have been incorporated as repeating unit cells into lattice structures for cushioning and shock absorbing purposes (see e.g., U.S. Pat. Nos. 8,919,750 and 10,986,936). These lattice structures (sometimes referred to as "lofted lattices") rely on the buckling behavior of their walls to tune their impact absorbing performance and can incorporate pre-buckled walls to further tune their performance (compare FIG. 1 and FIG. 2) herein. However, currently available structures are limited in their range of performance, and their remains a need for new lofted lattice structures.

SUMMARY

An additively manufactured lattice is described herein. The lattice is comprised of or consists of a plurality of symmetrically oriented repeating unit cells. Each of the unit cells is comprised of a vertically oriented tubular structure having a top edge and bottom edge, said tubular structure defined by a circumferential side wall extending from said top edge to said bottom edge. The side wall has a lower portion, an intermediate portion, and an upper portion, with the lower portion terminating at the bottom edge, the upper portion terminating at the top edge, and the intermediate portion positioned between the lower portion and the upper portion. A plurality of spaced legs (preferably symmetrically spaced) is included with each unit cell, with each leg formed as an outfolding of the side wall, each outfolding beginning at the side wall intermediate portion and extending progressively further outward through the side wall lower portion to the bottom edge. The side wall typically serves as a buckling wall, which in some embodiments has a progressively graded buckling response from the upper portion through the intermediate portion to the lower portion, as discussed in greater detail below.

According to some embodiments of the current invention, an additively manufactured lattice comprises a plurality of symmetrically oriented repeating unit cells, and each of the unit cells includes a vertically oriented tubular structure having a top edge and bottom edge. The tubular structure is defined by a circumferential side wall extending from the top edge to the bottom edge, and the side wall has a lower portion, an intermediate portion, and an upper portion. The lower portion terminates at the bottom edge and the upper portion terminates at the top edge. A plurality of symmetrically spaced legs is formed as an outfolding of the side wall, and each outfolding begins at the side wall intermediate portion and extends progressively further outward through the side wall lower portion to the bottom edge.

In some embodiments, side walls of adjacent unit cells in the lattice are at least partially merged with (or interconnected with) one another.

In some embodiments, the symmetrically spaced legs of adjacent unit cells in the lattice are at least partially, or in some embodiments completely, nested between one another.

In some embodiments, the symmetrically spaced legs are configured as a plurality of circumferential, outwardly tapering, undulations in the side wall lower portion.

In some embodiments, the side wall further comprises a plurality of symmetrically spaced infoldings, with an infolding between each the outfolding, with the outfoldings defining external vertices and the infolding defining internal vertices, and with a plurality of, or in some embodiments all of, the external vertices of each unit cell nested into (and optionally connected to or merged with) internal vertices of adjacent unit cells.

In some embodiments, the tubular structure upper portion has a cross-sectional configuration that is circular, oval, or polygonal.

In some embodiments, the plurality of symmetrically spaced legs comprises three symmetrically spaced legs.

In some embodiments, the lattice comprises a planar portion, a curved portion, or a combination thereof.

In some embodiments, the curved portion is present, and the unit cells of the curved portion comprise conformal unit cells.

In some embodiments, the side wall has a plurality of perforations therein (optionally with at least one perforation included in each of the side wall lower portion, intermediate portion, and upper portion).

In some embodiments, the side wall comprises a buckling wall having a progressively graded buckling response from the upper portion through the intermediate portion to the lower portion.

In some embodiments, the legs are configured to disperse impact force received on a top edge thereof across a greater surface area of an adjacent or underlying structure, and/or provide channels for energy dissipation or dispersion of that force.

According to some embodiments, a lattice comprises a first lattice layer and a second lattice layer, each of the layers comprising a lattice as described herein, with (a) the bottom edges of each the lattice aligned with and connected to one another, (b) the top edges of each the lattice aligned with and connected to one another; (c) the bottom edge the first lattice layer aligned with the top edge of the second lattice layer, or (d) a combination thereof.

In some embodiments, the lattice is comprised of metal, polymer, or a composite thereof.

In some embodiments, the lattice is rigid, flexible, or elastic.

In some embodiments, the lattice is produced by a process of additive manufacturing (e.g., selective laser sintering (SLS), fused deposition modeling (FDM), stereolithography (SLA), three-dimensional printing (3DP), or multijet modeling (MJM)).

In some embodiments, a cushion, shock absorber, vibration isolater, protective pad or heat exchanger comprises a lattice described herein.

In some embodiments, a wearable garment, helmet or footwear article having an impact absorbing protective pad therein is provided, and the protective pad comprises a lattice as described herein.

According to some embodiments of the invention, a method of making a lattice, or an object including a lattice, where the lattice is as described herein includes (a) providing a digital model of the lattice or object including a lattice; and then (b) producing the lattice or object from the digital model by an additive manufacturing process.

In some embodiments, the producing step is carried out by selective laser sintering (SLS), fused deposition modeling (FDM), stereolithography (SLA), three-dimensional printing (3DP), or multijet modeling (MJM).

The foregoing and other objects and aspects of the present invention are explained in greater detail in the non-limiting examples shown in the drawings herein and the specification below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which non-limiting examples of the invention are shown. This invention may, however, be embodied in many different forms and should not be construed as limited to the embodiments set forth herein; rather these examples are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Unit Cells and Lattices

In the non-limiting examples of embodiments of FIGS. 3-9 and 10-15, an additively manufactured lattice (21, 21') is comprised of a plurality of symmetrically oriented repeating unit cells (22, 22'). Each of the unit cells includes a vertically oriented tubular structure having a top edge (23, 23') and bottom edge (24, 24'), with the tubular structure defined by a circumferential side wall (25, 25') extending from the top edge to the bottom edge. The side wall has a lower portion (25a, 25a'), an intermediate portion (25b, 25b'), and an upper portion (25c, 25c'). The lower portion terminates at the bottom edge and the upper portion terminates at the top edge. The lattice (21, 21') has plurality of symmetrically spaced legs (26, 26'), and each leg is formed as an outfolding (27, 27') of the side wall. Each outfolding (27, 27') begins at the side wall intermediate portion (25b, 25b') and extends progressively further outward through the side wall lower portion (25a, 25a') to the bottom edge (24, 24').

In some embodiments, and as shown in FIGS. 3-15, the side walls of adjacent unit cells in the lattice are at least partially merged with (or interconnected with) one another.

Figure 18:
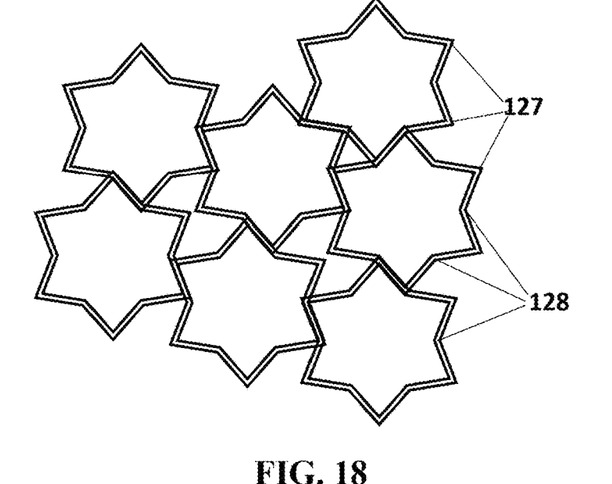
FIG. 18 is a top sectional view of a lattice comprised of six-legged unit cells, the section taken through the side wall lower portion.
Figure 19:
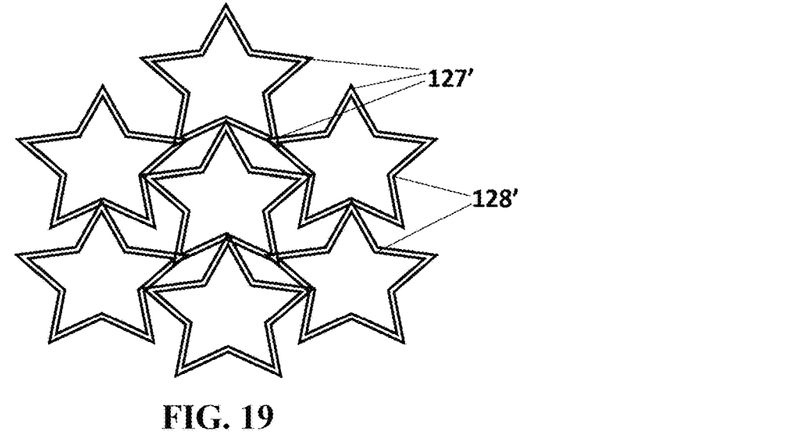
FIG. 19 is a top sectional view of a lattice comprised of five-legged unit cells, the section taken through the side wall lower portion.
Figure 20:
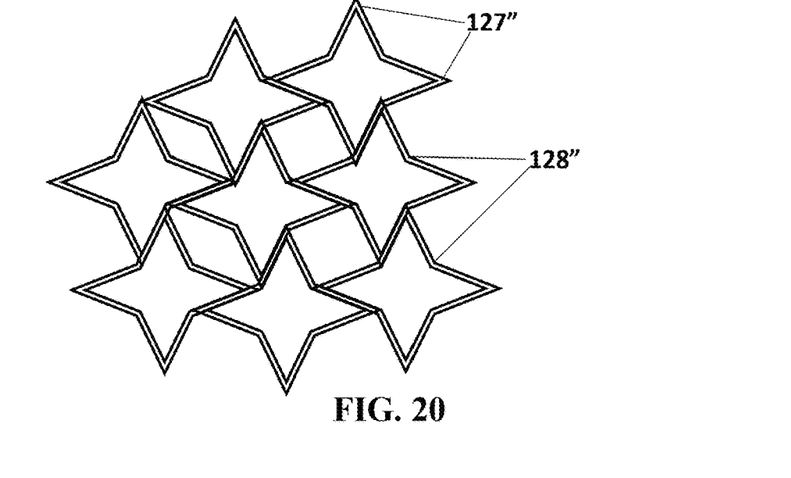
FIG. 20 is a top sectional view of a lattice comprised of four-legged unit cells, the section taken through the side wall lower portion.

In some embodiments, and as shown in FIGS. 3-15 and further in FIGS. 18-20, the symmetrically spaced legs of adjacent unit cells in the lattice are at least partially, or in some embodiments completely, nested between one another. The symmetrically spaced legs are preferably configured as a plurality of circumferential, outwardly tapering, undulations in the side wall lower portion.

As will be seen in the Figures (e.g., FIG. 7), the side walls can comprise a plurality of symmetrically spaced infoldings (28, 28'), with an infolding (28, 28') between each the outfolding (27, 27'), with the outfoldings (27, 27') defining external vertices and the infolding (28, 28') defining internal vertices, and with a plurality of, or in some embodiments all of, the external vertices of each unit cell nested into (and optionally connected to or merged with) internal vertices of adjacent unit cells.

While in the embodiments of FIGS. 3-15 the upper portion is shown with a hexagonal or round cross-section, any tubular cross-sectional configuration can be used, including circular, oval, and other polygonal configurations (e.g., regular or irregular polygon, including regular and irregular triangular, rectangular, pentagonal, hexagonal, heptagonal, octagonal, etc.).

Also, while the embodiments of FIGS. 3-15 show the plurality of symmetrically spaced legs as consisting of three evenly or symmetrically spaced legs (e.g., a tripodal unit cell), numerous other configurations can be implemented, including but not limited to unit cells having four legs (FIG. 20), five legs (FIG. 19), or six legs (FIG. 18), or more. As above, the legs are formed as outfoldings (127, 127', 127") and infoldings (128, 128', 128") in the wall, defining external vertices and internal vertices respectively. Note that in some embodiments (FIGS. 18 and 20) all external vertices nest into the internal vertices of adjacent unit cells, while in other embodiments (FIG. 19), some but not all external vertices nest into the internal vertices of adjacent unit cells. In addition, while the figures show lattices comprised of a single repeating unit cell, in other embodiments the lattices can be comprised of a tiling or tessellation of two or more different unit cells.

When implemented for a specific application, the lattice itself may be configured as a planar portion, a curved portion, or a combination thereof. Unit cells in curved portions of the lattice may be conformal unit cells (i.e., giving a conformal lattice). Additional components can be included in the object containing the lattice, such as a partial or complete surrounding skin or cage, a wall or platform, a connecting member, etc., depending on the end application of the lattice.

In some embodiments, though not necessarily essential, the side wall can have a plurality of perforations (32, 32') therein (optionally with at least one perforation included in each of the side wall lower portion, intermediate portion, and upper portion). These openings may serve to enhance resin flow and filing during some types of additive manufacturing (e.g., bottom-up stereolithography).

The side wall typically serves as a buckling wall, which in some embodiments has a progressively graded buckling response from the upper portion through the intermediate portion to the lower portion (for example, as may be determined by the shape and number of the legs, and/or variations in the wall thickness in different portions of the unit cell).

Figure 16:
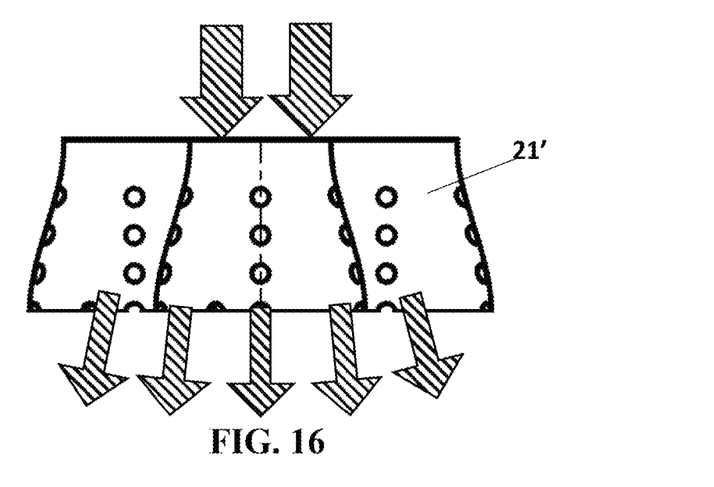
FIG. 16 is a side view of a lattice as described herein, schematically illustrating the dispersion of a concentrated or focused force received on a top side thereof, via the legs to the bottom side thereof.

In some embodiments, the legs are configured to disperse impact force received on a top edge thereof across a greater surface area of an adjacent or underlying structure (as schematically illustrated in FIG. 16), and/or provide channels for energy dissipation or dispersion of that force. This feature can be useful in applications where an impact force is received by a smaller region of the lattice (e.g., a concentrated or focused impact) rather than received across a larger region of the lattice. Such force dispersion may be particularly desirable when the lattice is connected to an adjacent structure (42) a skin-contact or wearer-facing component such as a fabric in a body pad).

Figure 17:
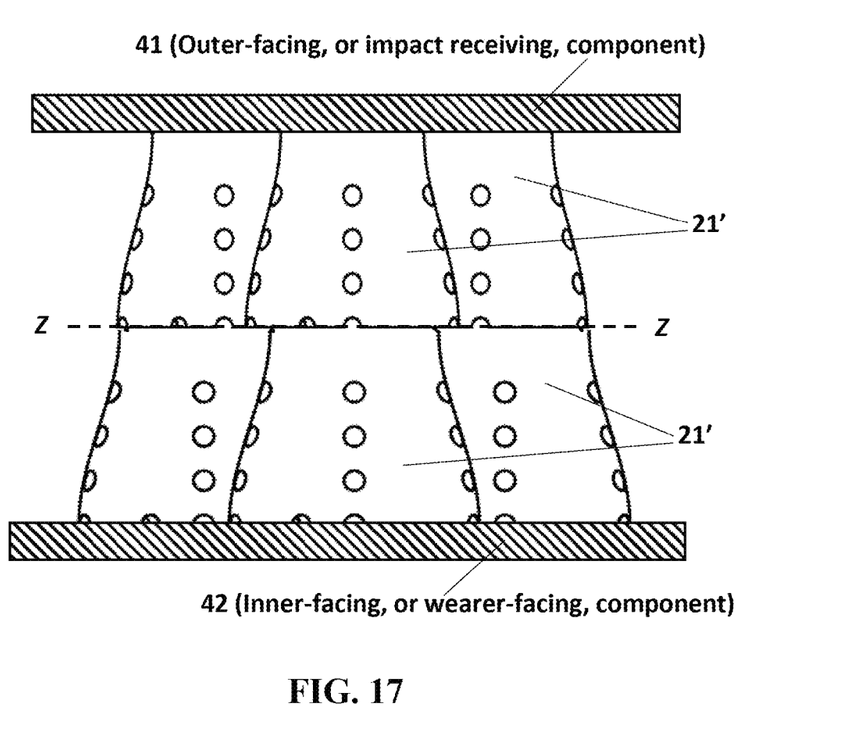
FIG. 17 is a side view of a non-limiting example of a multi-layer lattice structure incorporating the lattice of FIG. 10-16.

Also, while FIGS. 3-15 show lattices in a single layer, this is for clarity and does not preclude the lattices being incorporated into multi-layer structures. For example, a multi-layer lattice can include a first lattice layer and a second lattice layer, each of the layers comprising a lattice as described herein, with (a) the bottom edges of each the lattice aligned with and connected to one another, (b) the top edges of each the lattice aligned with and connected to one another; (c) the bottom edge the first lattice layer aligned with the top edge of the second lattice layer (see, e.g., FIG. 17), or (d) a combination thereof. And the lattices described herein can be combined as a composite article with other types of lattices, such a strut-and-node lattices, surfaces lattices, etc.

The lattices may be comprised of metal, polymer, or a composite thereof, and the lattices may be rigid, flexible, or elastic, depending on the specific end-use of the lattice, and the additive manufacturing process by which the lattice is made.

Additive Manufacturing.

Lattices as described above, typically embodied in an object comprising that lattice as described above, are made by additive manufacturing processes that include the steps of: (a) providing a digital model of the lattice or object including the lattice; and then (b) producing that object or lattice from the digital model by an additive manufacturing process.

Numerous additive manufacturing processes are known. Suitable techniques include, but are not limited to, techniques such as selective laser sintering (SLS), fused deposition modeling (FDM), stereolithography (SLA), material jetting including three-dimensional printing (3DP) and multijet modeling (MJM)(MJM including Multi-Jet Fusion such as available from Hewlett Packard), and others. See, e.g., H. Bikas et al., *Additive manufacturing methods and modelling approaches: a critical review*, Int. J. Adv. Manuf. Technol. 83, 389-405 (2016).

Stereolithography, including bottom-up and top-down techniques, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

Resins for additive manufacturing of polymer articles are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, Proc. Natl. Acad. Sci. USA 113, 11703-11708 (Oct. 18, 2016). In some embodiments, CLIP employs features of a bottom-up three-dimensional fabrication as described above, but the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

After the object is formed, it is typically cleaned (e.g., by washing, centrifugal separation, wiping, blowing, etc), and in some embodiments then further cured, preferably by baking (although further curing may in some embodiments be concurrent with the first cure, or may be by different mechanisms such as contacting to water, as described in U.S. Pat. No. 9,453,142 to Rolland et al.). It can then be assembled into a garment, helmet, automotive or aerospace panel, or other object in accordance with known techniques, depending on the particular use or application of the product containing the lattice.

Uses and Applications.

The lofted lattices described herein have a variety of uses. They can serve as a cushion, shock absorber, vibration isolator, protective pad. In some embodiments they can be configured as a heat exchanger (i.e., connected to a heat source such as an electrical, opto-electrical, or electromechanical device, to serve as a heat sink).

In some applications, a A wearable garment, helmet or footwear article can have an impact absorbing protective pad or cushion therein, with the the protective pad comprising a lattice as described above.

More specific examples of articles or objects that can contain lattices as described herein include, but are not limited to, shin guards, knee pads, elbow pads, sports brassieres, bicycling shorts, backpack straps, backpack backs, neck braces, chest protectors, shoulder pads, protective vest, protective jackets, protective slacks, protective suits, protective overalls, protective jumpsuits, etc.

The foregoing is illustrative of the present invention, and is not to be construed as limiting thereof. The invention is defined by the following claims, with equivalents of the claims to be included therein.

I claim:
1. An additively manufactured lattice comprising:
a plurality of symmetrically oriented repeating unit cells,
each of said unit cells comprising a vertically oriented tubular structure having a top edge and bottom edge, said tubular structure defined by a circumferential side wall extending from said top edge to said bottom edge,
said side wall having a lower portion, an intermediate portion, and an upper portion, said lower portion terminating at said bottom edge and said upper portion terminating at said top edge; and a plurality of symmetrically spaced legs, each leg formed as an outfolding of said side wall, each outfolding beginning at said side wall intermediate portion and extending progressively further outward through said side wall lower portion to said bottom edge, wherein said side wall further comprises a plurality of symmetrically spaced infoldings, with an infolding between each said outfolding, with said outfoldings defining external vertices and said infolding defining internal vertices, and with a plurality of said external vertices of each unit cell nested into internal vertices of adjacent unit cells.

2. The lattice of claim 1, wherein said side walls of adjacent unit cells in said lattice are at least partially merged with or interconnected with one another.

3. The lattice of claim 1, wherein said symmetrically spaced legs of adjacent unit cells in said lattice are at least partially, or completely, nested between one another.

4. The lattice of claim 1, wherein said symmetrically spaced legs are configured as a plurality of circumferential, outwardly tapering, undulations in said side wall lower portion.

5. The lattice of claim 1, wherein said tubular structure upper portion has a cross-sectional configuration that is circular, oval, or polygonal.

6. The lattice of claim 1, wherein said plurality of symmetrically spaced legs comprises three symmetrically spaced legs.

7. The lattice of claim 1, wherein said lattice comprises a planar portion, a curved portion, or a combination thereof.

8. The lattice of claim 7, wherein said curved portion is present, and said unit cells of said curved portion comprise conformal unit cells.

9. The lattice of claim 1, wherein said side wall has a plurality of perforations therein.

10. The lattice of claim 1, wherein said side wall comprises a buckling wall having a progressively graded buckling response from said upper portion through said intermediate portion to said lower portion.

11. The lattice of claim 1, wherein said legs are configured to disperse impact force received on a top edge thereof across a greater surface area of an adjacent or underlying structure, and/or provide channels for energy dissipation or dispersion of that force.

12. A wearable garment, helmet or footwear article having an impact absorbing protective pad therein, said protective pad comprising a lattice of claim 1.

13. A lattice comprising:
a first lattice layer and a second lattice layer, each of said first and second lattice layers comprising:
a plurality of symmetrically oriented repeating unit cells, each of said unit cells comprising a vertically oriented tubular structure having a top edge and bottom edge, said tubular structure defined by a circumferential side wall extending from said top edge to said bottom edge,
said side wall having a lower portion, an intermediate portion, and an upper portion, said lower portion terminating at said bottom edge and said upper portion terminating at said top edge; and
a plurality of symmetrically spaced legs, each leg formed as an outfolding of said side wall, each outfolding beginning at said side wall intermediate portion and extending progressively further outward through said side wall lower portion to said bottom edge,
wherein said side wall further comprises a plurality of symmetrically spaced infoldings, with an infolding between each said outfolding,
with said outfoldings defining external vertices and said infolding defining internal vertices,
and with a plurality of said external vertices of each unit cell nested into internal vertices of adjacent unit cells,
wherein (a) said bottom edges of each said first and second lattice layer are aligned with and connected to one another, (b) said top edges of each said first and second lattice layer are aligned with and connected to one another; (c) said bottom edge of said first lattice layer is aligned with said top edge of said second lattice layer, or (d) a combination thereof.

14. The lattice of claim 1, wherein said lattice is comprised of metal, polymer, or a composite thereof.

15. The lattice of claim 1, wherein said lattice is rigid, flexible, or elastic.

16. The lattice of claim 1, wherein said lattice is produced by a process of additive manufacturing.

17. A cushion, shock absorber, vibration isolater, protective pad or heat exchanger comprising a lattice of claim 1.

18. A method of making a lattice, or object including a lattice, comprising:
(a) providing a digital model of said lattice or object including a lattice; and then
(b) producing said lattice or object from said digital model by an additive manufacturing process, wherein said lattice comprises:
a plurality of symmetrically oriented repeating unit cells, each of said unit cells comprising a vertically oriented tubular structure having a top edge and bottom edge, said tubular structure defined by a circumferential side wall extending from said top edge to said bottom edge,
said side wall having a lower portion, an intermediate portion, and an upper portion, said lower portion terminating at said bottom edge and said upper portion terminating at said top edge; and
a plurality of symmetrically spaced legs, each leg formed as an outfolding of said side wall, each outfolding beginning at said side wall intermediate portion and extending progressively further outward through said side wall lower portion to said bottom edge,
wherein said side wall further comprises a plurality of symmetrically spaced infoldings, with an infolding between each said outfolding,
with said outfoldings defining external vertices and said infolding defining internal vertices,
and with a plurality of said external vertices of each unit cell nested into internal vertices of adjacent unit cells.

19. The method of claim 18, wherein said producing step is carried out by selective laser sintering (SLS), fused deposition modeling (FDM), stereolithography (SLA), three-dimensional printing (3DP), or multijet modeling (MJM).

* * * * *